(12) United States Patent
Yang et al.

(10) Patent No.: US 8,184,899 B2
(45) Date of Patent: May 22, 2012

(54) METHOD OF DETECTING A DEFECT ON AN OBJECT

(75) Inventors: Yu-Sin Yang, Seoul (KR); Kyung-Suk Song, Gyeongsangnam-do (KR); Ji-Hae Kim, Anyang-si (KR); Chung-Sam Jun, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 569 days.

(21) Appl. No.: 12/383,017

(22) Filed: Mar. 19, 2009

(65) Prior Publication Data

US 2009/0238445 A1    Sep. 24, 2009

(30) Foreign Application Priority Data

Mar. 20, 2008    (KR) .................... 10-2008-0025901

(51) Int. Cl.
*G06K 9/00* (2006.01)

(52) U.S. Cl. ..................................... 382/149

(58) Field of Classification Search .............. 382/141, 382/144–150
See application file for complete search history.

(56) References Cited

U.S. PATENT DOCUMENTS

| 7,660,687 B1* | 2/2010 | De et al. .................... 702/85 |
| 7,804,993 B2* | 9/2010 | Dorphan et al. .............. 382/141 |
| 7,925,072 B2* | 4/2011 | Chen et al. .................. 382/145 |
| 2007/0165939 A1* | 7/2007 | Savareigo et al. ............ 382/145 |

FOREIGN PATENT DOCUMENTS

| JP | 07-190739 | 7/1995 |
| JP | 2002054915 | 2/2002 |
| JP | 2003270168 | 9/2003 |
| KR | 100425447 | 3/2004 |
| KR | 100474571 | 2/2005 |
| KR | 1020060077660 A | 7/2006 |

* cited by examiner

*Primary Examiner* — Patrick J Connolly
(74) *Attorney, Agent, or Firm* — Onello & Mello, LLP

(57) ABSTRACT

In a method of detecting a defect on an object, a preliminary reference image can be obtained from a plurality of comparison regions defined on the object. The preliminary reference image is divided into reference zones by a similar brightness. Each of the reference zones is provided with substantially the same gray level, respectively, to obtain a reference image. Whether a defect exists in an inspection region in the comparison regions is determined using the reference image. Thus, defects in the inspection regions having different brightnesses can be detected using the properly obtained reference image.

15 Claims, 5 Drawing Sheets

METHOD OF DETECTING A DEFECT ON AN OBJECT

BACKGROUND

1. Field

Example embodiments relate to a method of detecting a defect on an object. More particularly, example embodiments relate to a method of detecting a defect generated, or otherwise present, on a semiconductor substrate.

2. Description of the Related Art

Generally, semiconductor devices are manufactured by various processes including a deposition process, a patterning process, a chemical mechanical polishing (CMP) process, a cleaning process, and other processes. Each process can introduce various types of defects on the semiconductor substrate, which can adversely affect the resulting semiconductor device. Therefore, a detection process for detecting the defects is performed so that decisions can be made for rectifying the defects, thereby improving device yield and reliability.

According to a conventional method of defect detection, a semiconductor substrate can be divided into a plurality of inspection regions. An inspection image of an inspected region can be compared with a reference image of a nearby inspection region to identify defects in the inspected region. In other words, the presence of defects in the inspected region is determined using only a single reference image.

In contemporary memory devices it is common for both a cell region and a peripheral region to be present in each of the dies on the semiconductor substrate. The cell region and the peripheral region can quite commonly have different reflective properties and scattering coefficients with respect to the incident inspection light. Further, certain differences in properties such as layer thickness can exist between dies located at a central portion and an edge portion of the semiconductor substrate. That is, certain regions of the semiconductor substrate can have clearly discriminated brightness properties.

Thus, when defects present in inspection regions having different brightness properties are detected using only a single reference image, reliability of the defect detection process can be significantly low. That is, when the defect detection process is performed using the single reference image having a single brightness property despite the fact that the inspection regions can have different brightness properties, an inspection region without a defect can be determined to be abnormal or an inspection region with a defect may be determined to be normal. As a result, the conventional inspection method may vary in effectiveness with respect to position of the inspected region on the semiconductor substrate or with respect to the brightness of the inspected region.

SUMMARY

Example embodiments provide a method of accurately detecting a defect on an object that may have substantially the same detectability with respect to inspection regions having different brightnesses.

According to some example embodiments, there is provided a method of detecting a defect on an object. In the method of detecting the defect on the object, a preliminary reference image is obtained from a plurality of comparison regions defined on the object. The preliminary reference image is divided into reference zones by a similar brightness. Each of the reference zones is provided with substantially the same gray level, respectively, to obtain a reference image. Whether a defect exists in an inspection region among the comparison regions is determined using the reference image.

In an example embodiment, obtaining the preliminary reference image includes obtaining a gray level average of pixels located on substantially the same coordinate in each of the comparison regions.

In an example embodiment, obtaining the reference image includes providing all of the pixels in the reference zone with a maximum vale of gray level averages of the pixels in the reference zone. Alternatively, obtaining the reference image includes providing all of the pixels in the reference zone with a mean of the gray level averages of the pixels in the reference zone.

In an example embodiment, determining whether the defect exists in the inspection region includes calculating a plurality of standard deviations with respect to gray levels of the reference image, and determining whether the defect exists in the inspection region uses gray levels of the inspection region and the standard deviations.

According to some example embodiments, there is provided a method of detecting a defect on a semiconductor substrate. In the method of detecting the defect on the semiconductor substrate, a gray level average of pixels located at substantially a same coordinate in each of cells of a die in the semiconductor substrate is calculated to obtain a preliminary reference image. The preliminary reference image is divided into reference zones by a similar brightness. Each of the reference zones is provided with substantially the same gray level, respectively, to obtain a reference image. A plurality of standard deviations with respect to gray levels of the reference image is calculated. Whether a defect exists in the cell is determined using the standard deviations and the gray levels of the cell.

In an example embodiment, obtaining the reference image can include providing all of the pixels in the reference zone with a maximum vale of gray level averages of the pixels in the reference zone. Alternatively, obtaining the reference image can include providing all of the pixels in the reference zone with a mean of the gray level averages of the pixels in the reference zone.

According to some example embodiments, there is provided a method of detecting a defect on a semiconductor substrate. In the method of detecting the defect on the semiconductor substrate, a gray level average of pixels located at substantially a same coordinate in each of dies in the semiconductor substrate is calculated to obtain a preliminary reference image. The preliminary reference image is divided into reference zones by a similar brightness. Each of the reference zones is provided with substantially the same gray level, respectively, to obtain a reference image. A plurality of standard deviations with respect to gray levels of the reference image is calculated. Whether a defect exists in the die is determined using the standard deviations and the gray levels of the die.

In an example embodiment, the reference zones include a central portion, a middle portion and an edge portion of the semiconductor substrate.

In an example embodiment, obtaining the reference image can include providing all of the dies in the reference zone with a maximum vale of gray level averages of the dies in the reference zone. Alternatively, obtaining the reference image can include providing all of the dies in the reference zone with a mean of the gray level averages of the dies in the reference zone.

According to the example embodiments, defects present in the inspection regions having different brightnesses may be detected using the properly obtained reference image. Thus, defect detectability with respect to the inspection regions is stabilized. As a result, defects present on the semiconductor substrate can be accurately detected.

BRIEF DESCRIPTION OF THE DRAWINGS

Example embodiments will be more clearly understood from the following detailed description taken in conjunction with the accompanying drawings.

FIG. 1 is a flow chart illustrating a method of detecting a defect on an object in accordance with a first example embodiment of the present invention;

FIG. 2 is a scanning electron microscope (SEM) picture showing a preliminary reference image.

FIG. 3 is a SEM picture illustrating a reference image;

FIG. 4 is a graph illustrating pixel numbers with respect to gray levels of the reference image in FIG. 3; and FIG. 5 is a flow chart illustrating a method of detecting a defect on an object in accordance with a second example embodiment of the present invention.

DETAILED DESCRIPTION OF EMBODIMENTS

Figure 1:
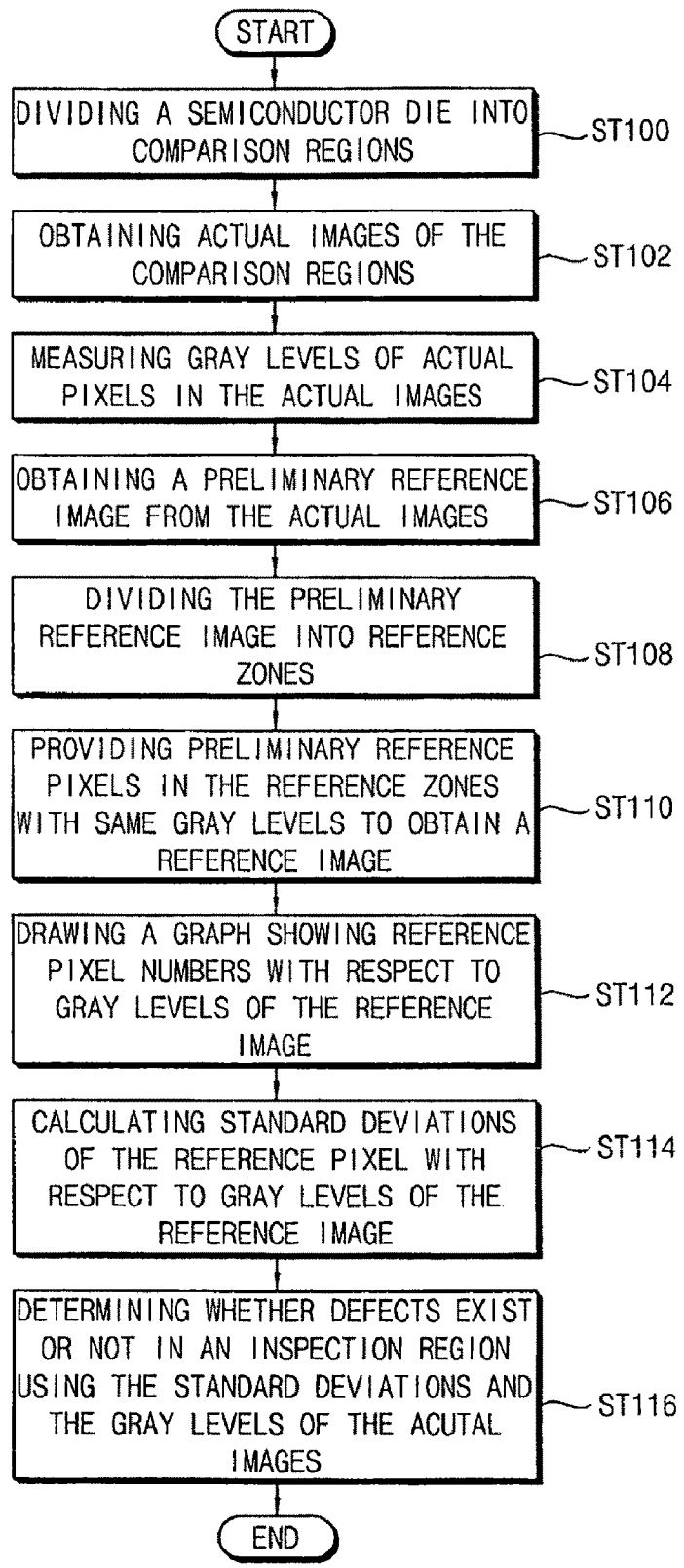
FIGS. 1 to 5 represent non-limiting, example embodiments as described herein.

This application claims priority under 35 U.S.C. §119 to Korean Patent Application No. 10-2008-0025901, filed on Mar. 20, 2008 in the Korean Intellectual Property Office (KIPO), the contents of which are herein incorporated by reference in their entirety.

Various example embodiments will be described more fully hereinafter with reference to the accompanying drawings, in which some example embodiments are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Example Embodiment 1

FIG. 1 is a flow chart illustrating a method of detecting a defect on an object in accordance with a first example embodiment of the present invention.

In this example embodiment, the object to which the method of detecting the defect may be applied can include a semiconductor die having a plurality of cells formed thereon. Further, the semiconductor die may include a cell region and a peripheral region configured to surround or encompass the cell region. Patterns can be repeatedly and regularly arranged in the cell region, while patterns can be irregularly arranged in the peripheral region.

Referring to FIG. 1, in step ST100, the semiconductor die can be divided into a plurality of comparison regions. In this example embodiment, the comparison regions can correspond to the cell region.

In step ST102, actual images of the comparison regions can be obtained. The actual images can be obtained by using light reflected from the comparison regions or by scanning the comparison regions.

In step ST104, gray levels of pixels in the actual images are measured. In this example embodiment, the gray levels can be measured simultaneously with the operation of obtaining of the actual images.

In step ST106, a preliminary reference image is obtained from the actual images. In this example embodiment, gray level averages of each of the actual pixels, which may be located proximal to substantially the same coordinate on the die, in the actual images can be calculated. Preliminary reference pixels can be provided with the gray level averages, respectively, to obtain the preliminary reference image. That is, the preliminary reference pixels in the preliminary reference image may have the gray level average of the actual image by the pixel.

Figure 2:
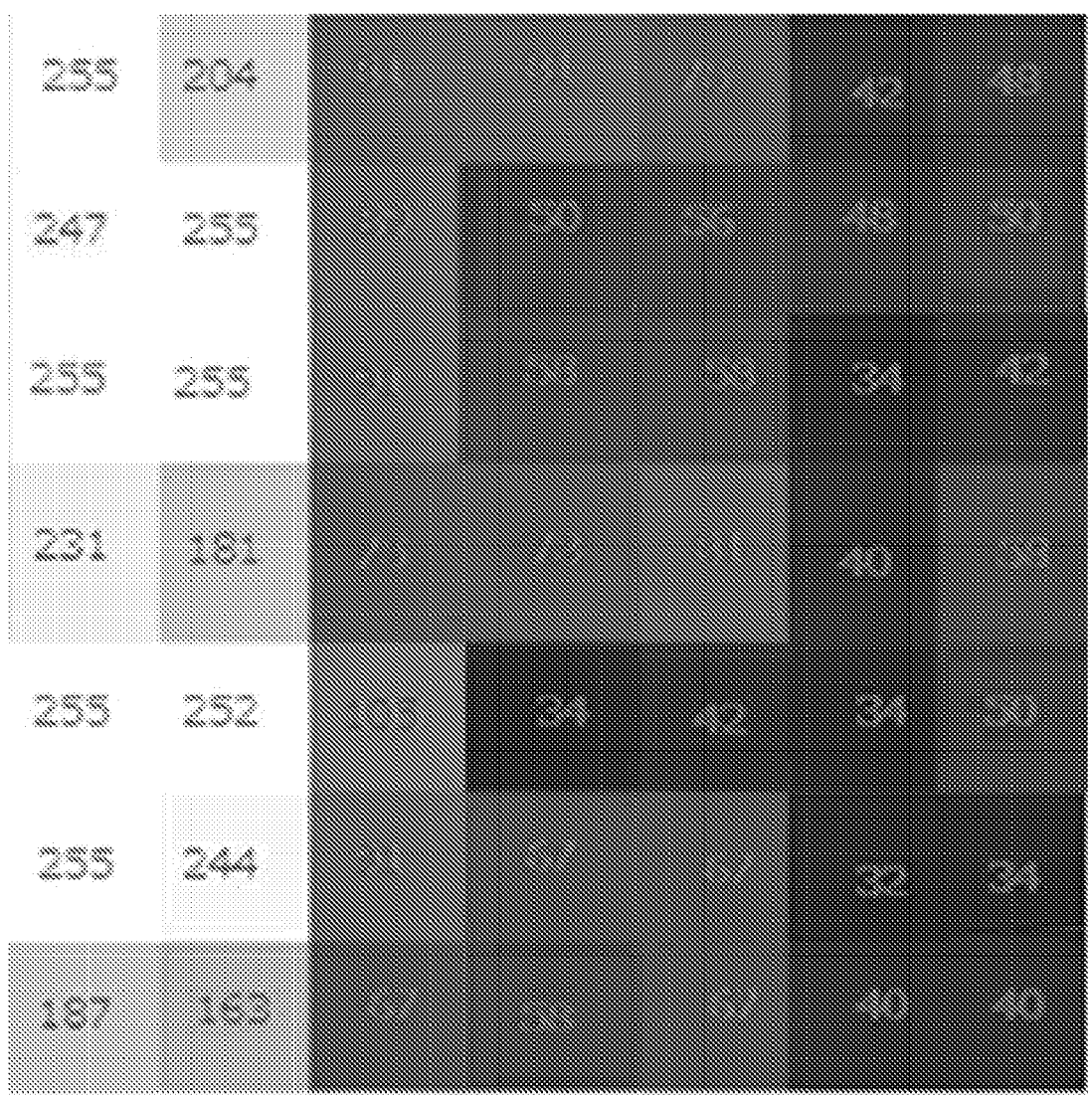

In step ST108, the preliminary reference image is divided into reference zones according to similar brightness levels or values. Here, because the adjacent preliminary reference pixels may have similar gray levels, the reference zones may be defined by determining boundary lines between those preliminary reference pixels having sharply different gray levels. FIG. 2 is a scanning electron microscope (SEM) picture showing an example preliminary reference image. As shown in FIG. 2, the preliminary reference pixels having similar brightness values may be located in each of the reference zones.

In step ST110, all of the preliminary reference pixels in the reference zone may be provided with substantially the same gray level to obtain a reference image. That is, the reference pixels in a reference zone of the reference image may have substantially the same gray level.

Here, the preliminary reference pixels can be provided with the substantially the same gray level according to their reference zones to remove noise caused by an error in obtaining the preliminary reference image. For example, when any one of the preliminary reference pixels in the preliminary reference image has a gray level value that is excessively lower than that of other preliminary reference pixels, the excessively low gray level may be determined to be caused by the error in measuring the preliminary reference image. Thus, the excessively low gray level may be removed from the reference image in order to obtain a more accurate reference image. According to some embodiments, the removal of noise can be performed, for example, by the following two processes.

Figure 3:
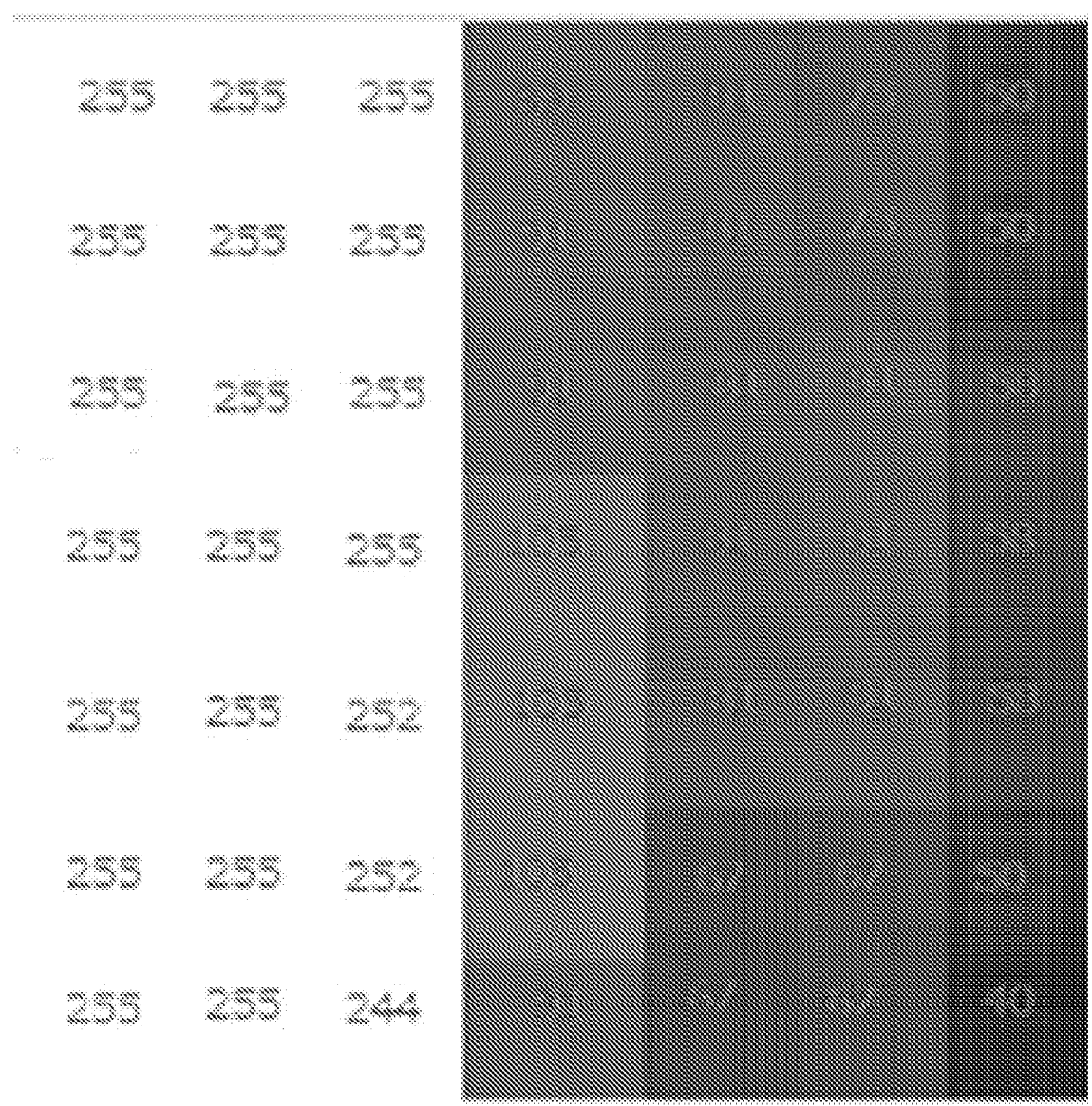

In one process, the noise may be removed by a dilation technique. According to the dilation technique, a maximum value of the gray levels of the preliminary reference pixels in the reference zone is determined. All of the gray levels of the preliminary reference pixels are then converted to the maximum value. FIG. 3 is a SEM picture illustrating the reference image. As shown in FIG. 3, all of the reference pixels in the reference zone are given substantially the same maximum value.

Alternatively, in another process, the noise may be removed by a smoothing technique. According to the smoothing technique, the gray level average of the preliminary reference pixels in the reference zone is calculated. The gray levels of the preliminary reference pixels are then converted to the gray level average.

Figure 4:
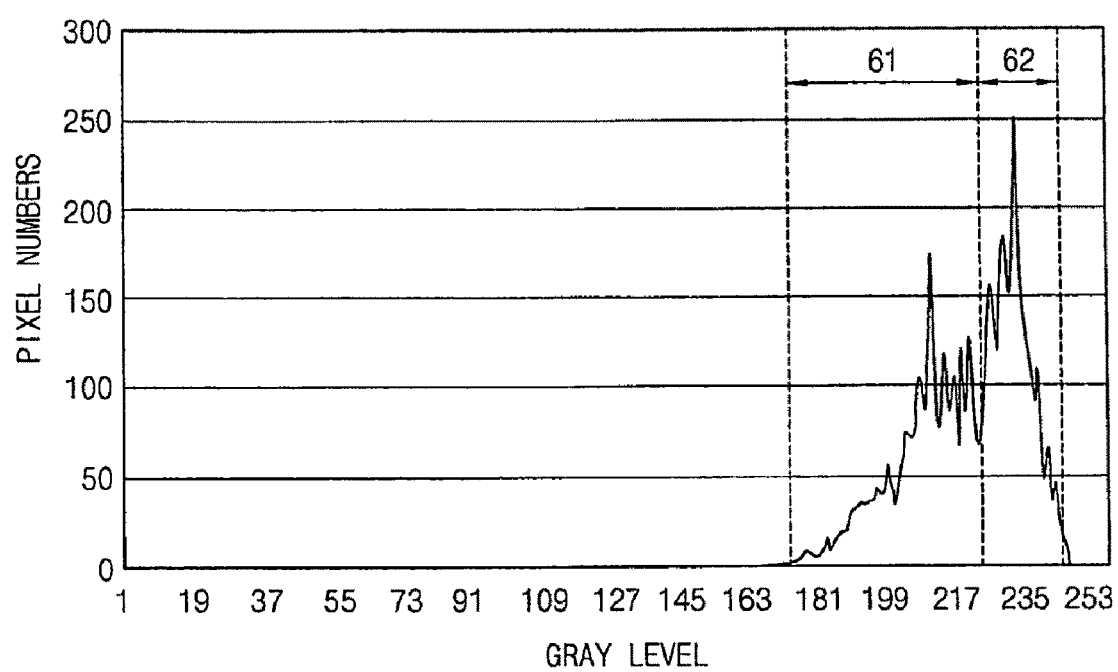

According to step ST112, and as shown in FIG. 4, a graph showing reference pixel numbers with respect to the gray levels of the reference image can be drawn. In FIG. 4, the horizontal axis of the graph represents the gray level and a vertical axis represents the number of reference pixels having a certain gray level.

In step ST114, a standard deviation of the reference pixel with respect to the gray level can be calculated based on a graph such as the graph of FIG. 4. Here, because the reference image can be partitioned according to relative brightnesses, at least two standard deviation values can be obtained for the reference pixel.

In step ST116, whether a defect may exist or not in an inspection region of the comparison regions can be determined based on the standard deviations and the actual gray levels of the actual image.

In this example embodiment, the existence of the defect in the inspection region can be determined based on whether a difference between the actual gray level of the inspection region and the gray level average and a difference between the reference gray level of the reference image and the gray level average is or is not within the standard deviations. Here, any one of the reference zones including an inspection position in the comparison regions can be identified. The standard deviation corresponding to the identified reference zone may be set as a standard for determining the existence of the defect in the inspection region. That is, the different standard deviations can be applied to the reference zones, respectively. Therefore, the inspection regions will have substantially the same defect detectability, even though they may have different brightness levels.

According to the present example embodiment, the reference image can be divided into reference zones by the different brightnesses. Thus, defect detectability with respect to the inspection region can be stabilized, irrespective of brightness. As a result, a defect present on the semiconductor die can be accurately detected.

Example Embodiment 2

Figure 5:
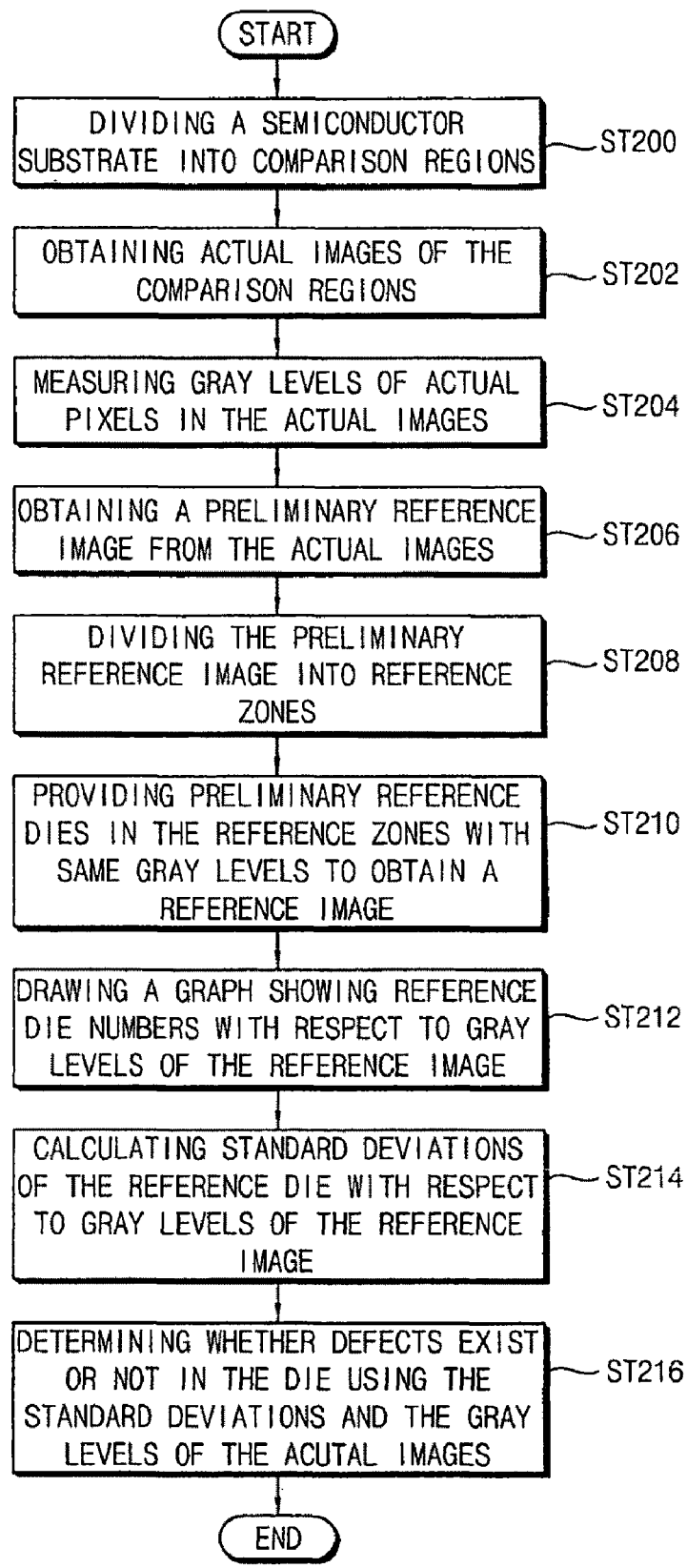

FIG. 5 is a flow chart illustrating a method of detecting a defect on an object in accordance with a second example embodiment of the present invention.

In this example embodiment, the object to which the method of detecting the defect may be applied may include a semiconductor substrate where a plurality of dies may be formed. Further, the dies in a central portion, the dies in an edge portion and the dies in a middle portion of the semiconductor substrate may have different brightnesses.

Referring to FIG. 5, in step ST200, the semiconductor substrate may be divided into a plurality of comparison regions.

In step ST202, actual images of the comparison regions can be obtained.

In step ST204, gray levels of the dies in the actual images can be measured.

In step ST206, a preliminary reference image is obtained from the actual images. In this example embodiment, gray level averages of each of the actual dies, which may be located proximal to substantially the same coordinate on the die, in the actual images can be calculated. Preliminary reference dies can be provided with the gray level averages, respectively, to obtain the preliminary reference image. That is, the preliminary reference dies in the preliminary reference image may have the gray level average of the actual image by the dies.

In step ST208, the preliminary reference image is divided into reference zones by according to similar brightness levels or values. Here, because the adjacent preliminary reference dies may have similar gray levels, the reference zones may be defined by determining boundary lines between those preliminary reference dies having sharply different gray levels. In this example embodiment, the reference zones may include the central portion, the middle portion, and the edge portion of the semiconductor substrate. Further, the reference zones may be determined manually by an inspector or automatically by an inspection tool.

In step ST210, all of the preliminary reference dies in the reference zone may be provided with substantially the same gray level to obtain a reference image. That is, the reference dies in a reference zone of the reference image may have substantially the same gray level. Removal of noise, can, for example, be performed by the dilation technique or the smoothing technique described above in connection with the first embodiment.

According to step ST212, a graph showing reference die numbers with respect to the gray levels of the reference image can be drawn.

In step ST214, a standard deviation of the reference die with respect to the gray level can be calculated based on a graph determined at step ST212. Here, because the reference image can be partitioned according to relative brightness, at least two standard deviation values can be obtained for the reference die.

In step ST216, whether a defect may exist or not in an inspection region of the comparison regions can be determined based on the standard deviations and the actual gray levels of the actual image.

In this example embodiment, the existence of the defect in the inspection region can be determined based on whether a difference between the actual gray level of the inspection region and the gray level average and a difference between the reference gray level of the reference image and the gray level average is or is not within the standard deviations. Here, any one of the reference zones including an inspection position in the inspection region can be identified. The standard deviation corresponding to the identified reference zone may be set as a standard for determining the existence of the defect in the inspection region. That is, the different standard deviations can be applied to the reference zones, respectively. Therefore, the inspection regions will have substantially the same defect detectability, even though they may have different brightness levels.

According to the present example embodiment, the reference image can be divided into reference zones by the different brightnesses. Thus, defect detectability with respect to the inspection region can be stabilized, irrespective of brightness. As a result, a defect present on the semiconductor die can be accurately detected.

As mentioned above, according to some example embodiments, defects present in inspection regions having different brightnesses may be detected using the properly obtained reference image. Thus, defect detectability with respect to the inspection regions can be stabilized. As a result, defects present on the semiconductor substrate can be accurately detected. While embodiments of the invention have been particularly shown and described with references to preferred embodiments thereof, it will be understood by those skilled in the art that various changes in form and details may be made herein without departing from the spirit and scope of the invention as defined by the appended claims.

What is claimed is:

1. A method of detecting a defect on an object, the method comprising:
   obtaining a preliminary reference image from a plurality of comparison regions that are defined on the object;
   dividing the preliminary reference image into reference zones by similar brightnesses;
   providing each of the reference zones with substantially same gray levels, respectively, to obtain a reference image; and
   determining whether a defect exists in an inspection region among the comparison regions using the reference image.

2. The method of claim 1, wherein obtaining the preliminary reference image comprises obtaining gray level averages of pixels that are located at substantially a same coordinate in each of the comparison regions.

3. The method of claim 2, wherein obtaining the reference image comprises providing all of the pixels in the reference zone with a maximum value of the gray level averages of the pixels in the reference zone.

4. The method of claim 2, wherein obtaining the reference image comprises providing all of the pixels in the reference zone with a mean value of the gray level averages of the pixels in the reference zone.

5. The method of claim 1, wherein determining whether the defect exists comprises:
   calculating a plurality of standard deviations with respect to gray levels of the reference image; and
   determining whether the defect exists in the inspection region using the standard deviations and a gray level of the inspection region.

6. The method of claim 1, wherein the object comprises a semiconductor die and the comparison regions comprise semiconductor cells.

7. The method of claim 1, wherein the object comprises a semiconductor substrate and the comparison regions comprise semiconductor dies.

8. The method of claim 1 wherein providing each of the reference zones with substantially same gray levels comprises determining whether each of the pixels in a reference zone has substantially said same gray level, and if the compared pixel does not have substantially the same gray level, modifying the gray level of the compared pixel that is not substantially the same gray level with a gray level that is the substantially same gray level.

9. A method of detecting a defect on a semiconductor die, the method comprising:
   calculating gray level averages of pixels that are located at substantially a same coordinate in each of cells formed on the semiconductor die to obtain a preliminary reference image;
   dividing the preliminary reference image into reference zones by similar brightnesses;
   providing each of the reference zones with substantially same gray levels, respectively, to obtain a reference image;
   calculating a plurality of standard deviations with respect to gray levels of the reference image; and
   determining whether a defect exists in the cell using the standard deviations and a gray level of the cell.

10. The method of claim 9, wherein obtaining the reference image comprises providing all of the pixels in the reference zone with a maximum value of the gray level averages of the pixels in the reference zone.

11. The method of claim 9, wherein obtaining the reference image comprises providing all of the pixels in the reference zone with a mean value of the gray level averages of the pixels in the reference zone.

12. A method of detecting a defect on a semiconductor substrate, the method comprising:
   calculating gray level averages of dies that are formed on the semiconductor substrate to obtain a preliminary reference image;
   dividing the preliminary reference image into reference zones by similar brightnesses;
   providing each of the reference zones with substantially same gray levels, respectively, to obtain a reference image;
   calculating a plurality of standard deviations with respect to gray levels of the reference image; and
   determining whether a defect exists in the die using the standard deviations and a gray level of the die.

13. The method of claim 12, wherein the comparison regions comprise a central portion, a middle portion and an edge portion of the semiconductor substrate.

14. The method of claim 12, wherein obtaining the reference image comprises providing all of the dies in the reference zone with a maximum value of the gray level averages of the dies in the reference zone.

15. The method of claim 12, wherein obtaining the reference image comprises providing all of the dies in the reference zone with a mean value of the gray level averages of the dies in the reference zone.

* * * * *